(12) United States Patent
Gluckstad (10) Patent No.: US 7,622,710 B2
(45) Date of Patent: Nov. 24, 2009

(54) OPTICAL MANIPULATION SYSTEM USING A PLURALITY OF OPTICAL TRAPS

(75) Inventor: Jesper Gluckstad, Frederiksberg (DK)

(73) Assignee: Danmarks Tekniske Universitet, Lyngby (DK)

( * ) Notice: Subject to any disclaimer, the term of this patent is extended or adjusted under 35 U.S.C. 154(b) by 122 days.

(21) Appl. No.: 11/908,830

(22) PCT Filed: Mar. 11, 2006

(86) PCT No.: PCT/DK2006/000141

§ 371 (c)(1),
(2), (4) Date: Jan. 10, 2008

(87) PCT Pub. No.: WO2006/097101

PCT Pub. Date: Sep. 21, 2006

(65) Prior Publication Data

US 2008/0231939 A1      Sep. 25, 2008

Related U.S. Application Data (60) Provisional application No. 60/662,793, filed on Mar. 18, 2005.

(30) Foreign Application Priority Data

Mar. 18, 2005     (DK)     ................................ 2005 00399

(51) Int. Cl.
*H01S 1/00* (2006.01)
*H01S 3/00* (2006.01)
*H05H 3/02* (2006.01)

(52) U.S. Cl. .................... 250/251; 250/458.1; 356/326; 356/317; 356/300; 356/311; 359/298; 359/368; 359/619; 359/626; 359/291

(58) Field of Classification Search ................. 250/251, 250/458.1; 356/326, 317, 300, 311; 359/298, 359/368, 619, 626, 291

See application file for complete search history.

(56) References Cited

U.S. PATENT DOCUMENTS 4,893,886 A     1/1990 Ashkin et al.

(Continued)

FOREIGN PATENT DOCUMENTS

WO     WO 0209483     1/2002

OTHER PUBLICATIONS

"Real-time three-dimensional optical micromanipulation of multiple particles and living cells" Rodrigo, P.J., DAria, V.R., Gluckstad, J., Optics Letters, vol. 29, No. 19, Oct. 1, 2004.*

(Continued)

*Primary Examiner*—Jack I Berman
*Assistant Examiner*—Meenakshi S Sahu
(74) *Attorney, Agent, or Firm*—Volentine & Whitt, P.L.L.C.

(57) ABSTRACT

The present invention relates to an optical manipulation system (10) for generation of a plurality of optical traps for manipulation of micro-objects including nano-objects using electromagnetic radiation forces in a micro-object manipulation volume (14), the system comprising a spatially modulated light source (16) for emission of a first light beam (24) with a spatially an adjustable spatial light modulator (26) for generating a second (28) and a third (30) modulated light beam, the second intensity modulated light beam propagating towards a first deflector (32) for deflection of the second light beam towards the micro-object manipulation volume (14), and the third intensity modulated light beam propagating towards a second deflector (34) for deflection of the third light beam towards the same volume (14). In one embodiment the optical manipulation system provides sets of beams propagating along substantially the same axis of propagation but in opposite directions, so-called counter-propagating beams, thereby forming a significant trapping force along the propagation axis of the beams for trapping of a micro-object.

16 Claims, 6 Drawing Sheets

U.S. PATENT DOCUMENTS

| | | | |
|---|---|---|---|
| 6,055,106 | A | 4/2000 | Grier et al. |
| 7,193,782 | B2 * | 3/2007 | Menon et al. ............... 359/626 |
| 2002/0020800 | A1 | 2/2002 | Knebel et al. |

OTHER PUBLICATIONS

Vincent Ricardo Daria et al, Dynamic Array of Dark Optical Traps, Applied Physics Letters, vol. 84, No. 3, Jan. 19, 2004. pp. 323-325.

Rodriogo, P.J. et al.; Conference Paper, p. 1-2; Conference on Imaging Manipulation and Analysis of Biochemicals, Cells, and Tissues II; San Jose, CA, USA; Jan. 27-28, 2004.

Peter John Rodrigo et al., Array of Optical Tweezers With Individual Beam-Steering and Polarization Control; Optics and Fluid Dynamics Dept., Riso National Laboratory, Proc. of SPIE vol. 5322; pp. 103-107.

Yusuke Oguara et al., Optical Manipulation of Microscopic Objects By Means of Vertical-Cavity Surface-Emitting Laser Array Sources; Applied Optics; vol. 40, No. 30, Oct. 20, 2001; pp. 5430-5435.

Peter John Rodrigo et al., Real-Time Three Dimensional Optical Micromanipulaton Of Multiple Particles and Living Cells; Optics and Plasma Research Dept., 2004 Optical Society of America; Optics Letters, vol. 29, No. 19, Oct. 1, 2004; pp. 2270-2272.

Dirk L. J. Vossen et al., Optical Tweezers and Confocal Microscopy for Simultaneous Three-Dimensional Manipulation and Imaging in Concentrated Colloidal Dispersions; Review of Scientific Instruments; vol. 15, No. 9, Sep. 2004, pp. 2960-2970.

Nicholas G. Dagalakis et al.; Micro-Mirror Array Control of Optical Tweezer Trapping Beams; National Standards and Technology; IEEE-NANO 2002; Aug. 25, 2002; pp. 177-180.

Aaron T. Ohta et al.; Dynamic DMD-Driven Optoelectronics Tweezers for Microscopic Particle Manipulation; Electrical Engineering Department; Univ. of California, Los Angeles; 2003 Optical Society of America.

* cited by examiner

OPTICAL MANIPULATION SYSTEM USING A PLURALITY OF OPTICAL TRAPS

CROSS REFERENCE TO RELATED APPLICATIONS

This application is the national phase under 35 U.S.C. 371 of PCT International Application No. PCT/DK2006/000141 which has an international filling date of Mar. 11, 2006, and also claims priority under 35 U.S.C. 119 to Danish application PA 2005 00399 filed on Mar. 18, 2005, and U.S. provisional application 60/662,793 filed on Mar. 18, 2005, all of which applications are hereby incorporated by reference in their entirety for all purposes as if fully set forth herein.

FIELD OF THE INVENTION

The present invention relates to manipulation of micro-objects including nano-objects, such as particles, micro-components, biological cells, bacteria, nano-tubes and collections of atoms etc, using electromagnetic radiation forces.

BACKGROUND OF THE INVENTION

It is well-known that in a strongly focused laser beam having an approximately Gaussian intensity profile, radiation pressure scattering and gradient force components are combined to provide a point of stable equilibrium located close to the focus of the laser beam. Scattering force is proportional to optical intensity and acts in the direction of the incident laser light. Gradient force is proportional to the optical intensity and points in the direction of the intensity gradient.

This effect is utilized in a so-called optical tweezer or optical trap since the optical gradient forces in a focused light beam trap a small micro-object at the focal point of the light beam. The micro-object is typically immersed in a fluid medium whose refractive index is lower than that of the micro-object. The optical tweezer technique has been generalized to enable manipulation of reflecting, absorbing and low dielectric constant micro-objects. Typically, a Gaussian beam is used for trapping of a micro-object with a refractive index that is higher than the refractive index of its surroundings while a donut beam is used for trapping of a micro-object with refractive index that is lower than the refractive index of its surroundings.

In U.S. Pat. No. 4,893,886, an optical trap for biological micro-objects is disclosed wherein biological micro-objects are kept in a single-beam gradient force trap using an infrared laser.

In U.S. Pat. No. 6,055,106, an apparatus for manipulating micro-objects is disclosed that comprises a diffractive optical element for receiving a light beam and forming a plurality of separate light beams, each of which is focused to form a separate optical trap or tweezer.

SUMMARY OF THE INVENTION

It is an object of the present invention to provide a simplified apparatus and method for simultaneous and individual control of the position and velocity of a plurality of micro-objects.

According to the present invention, the above-mentioned and other objects are fulfilled by an optical manipulation system for generation of a plurality of optical traps for manipulation of micro-objects (including nano-objects) in a micro-object manipulation volume, the system comprising a spatially modulated light source for emission of a first light beam with a spatially modulated intensity profile propagating towards a first adjustable spatial light modulator for generating a second and a third intensity modulated light beam, the second intensity modulated light beam propagating towards a first deflector for deflection of the second light beam towards the micro-object manipulation volume, and the third intensity modulated light beam propagating towards a second deflector for deflection of the third light beam towards the micro-object manipulation volume.

DETAILED DESCRIPTION OF PREFERRED EMBODIMENTS

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The basic principles of the present invention applies in general to beams of any kind of electromagnetic radiation, such as visible light, infrared radiation, ultraviolet radiation, X-rays, radio waves, etc.

In one embodiment of the invention, two or more beams intersect each other at selected intersecting angles for trapping of a micro-object. When a micro-object is trapped at the intersection of a plurality of beams, the focusing requirements of the individual beams are relaxed.

In an embodiment of the present invention, the optical manipulation system provides sets of beams propagating along substantially the same axis of propagation but in opposite directions, so-called counter-propagating beams, thereby forming a significant trapping force along the propagation axis of the beams for trapping of a micro-object.

In an embodiment of the present invention, controlled movement of a trapped micro-object may be obtained by controlled turning on and off of neighbouring light beams.

For sufficiently closely propagating beams, a trapped micro-object will move to a neighbouring beam upon turn-off of the presently trapping beam and turn-on of the neighbouring beam, since the resulting trapping force will pull the micro-object to the turned-on beam. By appropriate sequential turn-on and turn-off of beams, the micro-object may be moved as desired. The path of movement for an individual micro-object may be determined based on observation by a monitoring system, e.g. based on visual inspection, fluorescence, etc, e.g. for cytometry.

The spatially modulated light source may comprise an array of light sources wherein the emitted light intensity of each light source may be individually controlled for emission of the first light beam with a spatially modulated intensity profile.

For example, the spatially modulated light source may comprise vertical cavity surface emitting lasers, VCSELs. Typically, an array of VCSELs emits a plurality of substantially circular laser beams. One-dimensional or two-dimensional arrays are available, and the generated beams have intensity profiles with a low divergence and a low relative intensity noise due to the absence of mode competition In another embodiment, the spatially modulated light source comprises a light source for emission of a light beam propagating towards a beam deflector controlled to sequentially deflect the light beam in a plurality of directions thereby forming the first intensity modulated light beam by time multiplexing between different directions for generation of a beam with a specific average light intensity. The beam deflector may for example comprise a first mirror rotatable around a first axis for deflection of the incoming beam in an azimuth direction and a second mirror rotatable around a second axis perpendicular to the first axis for deflection of the incoming beam in an elevation direction.

In yet another embodiment of the invention, the spatially modulated light source comprises a light source for emission of a light beam propagating towards a second adjustable spatial light modulator for modulation of the light beam from the light source into the first intensity modulated light beam.

The deflectors may be based on reflection, refraction, absorption, diffraction, scattering, etc, of the electromagnetic beam.

The first and/or second adjustable spatial light modulator may comprise a Micro-Opto-Electro-Mechanical System (MOEMS), such as an array of adjustable micro-mirrors, e.g. a Digital Micro-mirror Device (DMD).

The DMD has a high spectral and spatial uniformity across the array of mirrors. The DMD has a high modulation speed; each mirror may switch in microseconds with maximum precision, and process a new page of data in less than 100 microseconds. Present DMDs provide an angular separation of deflected light beams of up to ±20°. Less than a micrometer may separate neighbouring mirrors. Further, the DMD is almost independent of wavelength and polarization of the incoming light beam.

It is an important advantage of the invention that the operation of preferred embodiments does not depend on coherence properties or polarization properties of the light source. Thus, the electromagnetic radiation may be spatially and/or temporally coherent or incoherent, e.g. laser light or maser radiation, however white light sources, such as super continuum sources, may also be utilized.

An adjustable spatial light modulator may split the incoming light beam into two diverging beams utilizing time-multiplexed deflection. For example, if the adjustable light modulator is a digital micro-mirror device wherein each mirror may be shifted between two angular positions, each mirror may toggle between the two positions with a selected frequency and a selected duty cycle. If the duty cycle is 50%, the incoming light beam is split into two deflected light beams with half the average intensity of the intensity of the incoming light beam assuming perfect light deflection. Changing the duty cycle will increase the average intensity of one of the deflected light beams and decrease the intensity of the other deflected light beam correspondingly.

By time-multiplexed deflection, interference is avoided in the micro-object manipulation volume, since the second and third intensity modulated light beams are never present in the same volume at the same time.

Further, it should be noted that there is no need to precisely align a first and a second DMD.

The second and third light beams may be further deflected into intersecting light beams.

The second and third light beams may be deflected into counter-propagating light beams.

The optical manipulation system may further comprise microscope objective lenses for focusing the deflected light beams onto the micro-object manipulation volume.

It is an important advantage of an optical manipulation system with counter-propagating beams according to the present invention, that positioning of micro-objects may be controlled within a large distance, e.g. greater than 50 µm, along the direction of propagation of the counter-propagating beams, and e.g. greater than 100 µm perpendicular to the direction of propagation of the counter-propagating beams. Thus, micro-objects may be moved well outside the focal plane of a microscope objective lens. A micro-object out of focus is hardly visible and measurements of particle position and velocity vectors would be very difficult in a conventional optical tweezer system. Further, spherical aberration would also cause problems in a conventional optical tweezer system. These problems are solved by the present invention as explained below.

Due to the relaxed focussing conditions of an optical manipulation system with counter-propagating beams, a preferred embodiment of the system comprises low numerical aperture (NA), non-immersion, objective lenses for controlled trapping of micro-objects including nano-objects in three dimensions and in real time. In this embodiment, the system is capable of providing a long working distance, e.g. greater than several millimetres, between optical components and the manipulation volume. Further, the system is capable of providing a wide manipulation volume, inter alia along the direction of propagation of the counter-propagating beams. Still further, the system is capable of providing a large field of view for imaging, e.g. through each of the two opposing objective lenses. Thus, limitations on the shape and size of the micro-object manipulation volume are much less strict than for conventional optical tweezers. This makes a sample insertion and ejection system possible that is similar to the insertion and ejection system of a compact-disk-reader.

As a further consequence of the large working distance made possible by the invention, simultaneous monitoring of trapped particles as observed from various arbitrary solid angles is possible. For example, apart from observing trapped micro-objects in a X-Y plane through one of the objective lenses, the micro-objects may also be observed from a direction perpendicular to the counter-propagating beams.

The improved information on the positions of trapped micro-objects in three dimensions may be used for feedback to the optical manipulation system for improved accuracy of the manipulation and/or for improved information on positions and/or velocities of trapped micro-objects.

The above and other features and advantages of the present invention will become more apparent to those of ordinary skill in the art by describing in detail exemplary embodiments thereof with reference to the attached drawings in which.

Figure 1:
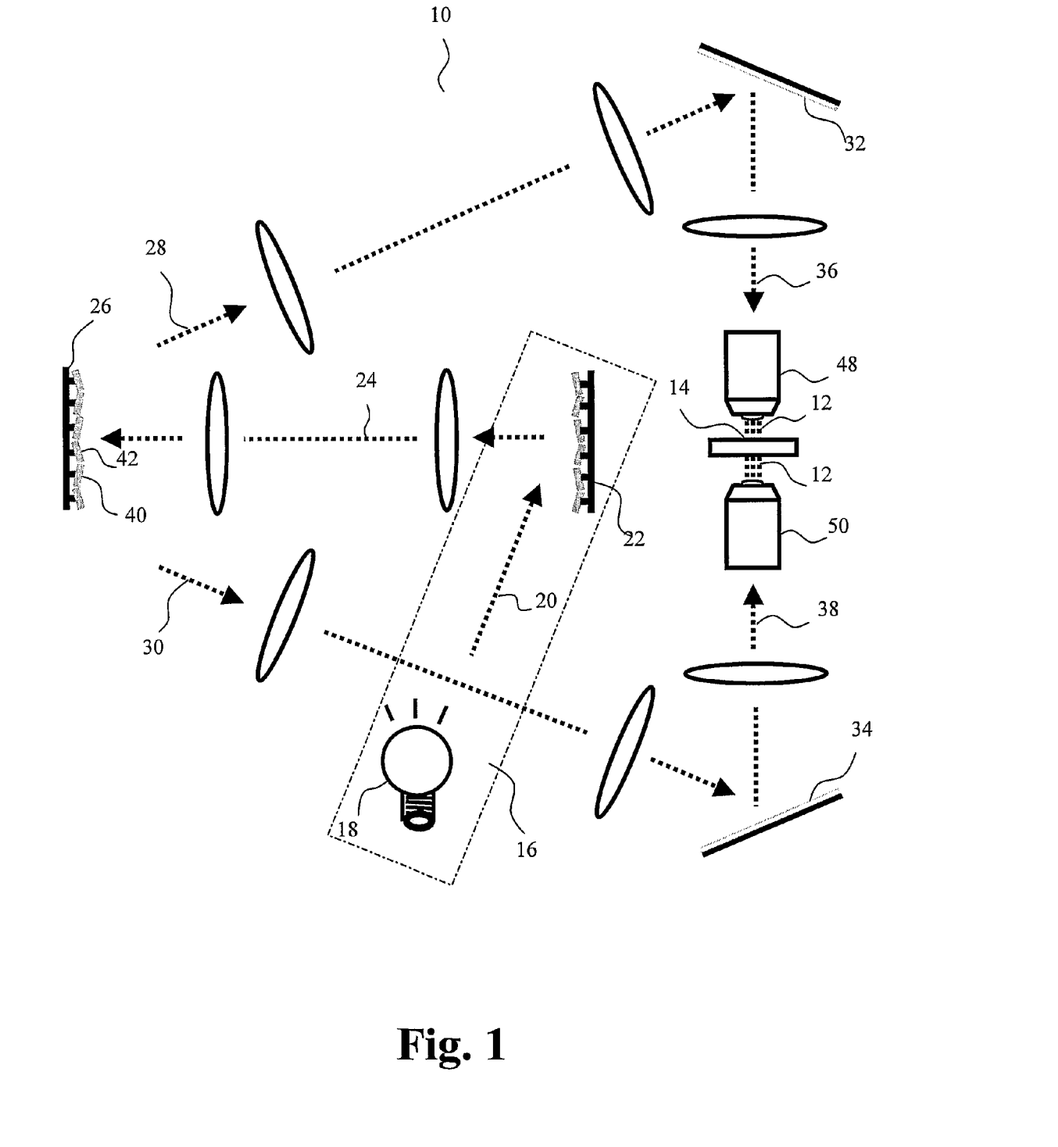
FIG. 1 schematically illustrates a first embodiment of the present invention, FIG. 2 schematically illustrates a second embodiment of the present invention, FIG. 3 schematically illustrates a third embodiment of the present invention, FIG. 4 schematically illustrates the operation of the present invention, FIG. 5 schematically illustrates a fourth embodiment of the invention including a monitoring system, and FIG. 6 schematically illustrates a fifth embodiment of the invention.

FIG. 1 schematically illustrates a first preferred embodiment of an optical manipulation system 10 for generation of a plurality of optical traps for manipulation of micro-objects (not shown) in a micro-object manipulation volume 14. The system 10 comprises a spatially modulated light source 16 with a light source 18 for emission of a light beam 20 propagating towards an adjustable spatial light modulator 22, which in the illustrated embodiment is a digital micro-mirror device (DMD) 22, for modulation of the light beam 20 into the first intensity modulated light beam 24. The intensity modulation is further explained with reference to FIG. 4.

The first light beam 24 with the spatially modulated intensity profile propagates towards a further adjustable spatial light modulator 26, which in the illustrated embodiment also is a DMD 26, for splitting the first intensity modulated light beam 24 into a second and a third intensity modulated light beam 28, 30 propagating in different directions, the second intensity modulated light beam 28 propagating towards a first deflector 32, e.g. a mirror, for deflection of the second light beam 28 towards the micro-object manipulation volume 14, and the third intensity modulated light beam 30 propagating towards a second deflector 34 for deflection of the third light beam 30 towards the micro-object manipulation volume 14.

The DMD 26 splits the incoming light beam 24 into two diverging beams 28, 30 utilizing time-multiplexed deflection. Each mirror 40, 42 may be shifted between two angular positions as schematically indicated for mirror 40 and mirror 42. Each mirror 40, 42 may toggle between the two positions with a selected frequency and a selected duty cycle. If the duty cycle is 50%, the incoming light beam 24 is split into two deflected light beams 28, 30 with half the average intensity of the intensity of the incoming light beam 24. Changing the duty cycle will increase the average intensity of one of the deflected light beams 28, 30 and decrease the average intensity of the other deflected light beam 28, 30 correspondingly.

Thus, in the illustrated embodiment, the optical manipulation system 10 provides sets of beams 12 propagating along substantially the same axis of propagation but in opposite directions thereby forming a significant average trapping force along the propagation axis of the beams for trapping of a micro-object.

Counter-propagating light fields provide a stationary optical potential well for a Brownian particle. By introducing variability in the relative strengths of the counter-propagating beams, dynamic control is provided of the axial location of the potential minimum where the micro-object obtains a stable equilibrium position.

If an optical field incident upon a particle is not strongly focused, scattering forces become dominant. In this situation, the particle experiences a net axial force in the direction of the Poynting vector. In 1970, Ashkin showed that between two opposing equal $TEM_{00}$ beams with waists slightly separated along the optical axis, a high-index sphere gets trapped at the symmetry point. At this trapping position, the net axial force on the object is zero and restoring. A pair of anti-parallel beams therefore forms a three-dimensional optical potential well for a dielectric particle and is known in the literature as a counter-propagating beam or dual-beam trap.

In preferred embodiments of the present invention with counter-propagating beams, adjustable axial stable-equilibrium positioning of a plurality of optically trapped micro-objects is provided. The mechanism for particle displacement along the optical axis is due to an induced differential average force that accompanies the change in axial location of the optical potential well minimum. Dynamic and non-mechanical control of the axial position of trapped objects may be applied for the study of interaction forces between micro-objects, such as microorganisms, and functionally modified surfaces, and for particle sorting through optical guiding and transport.

The illustrated embodiments provide an array of optical traps with 3-dimensional, real-time controlled micro-object positioning capabilities for simultaneous 3D trapping and independent manipulation of a plurality of micro-objects, such as particles, living cells, etc.

In the illustrated embodiments, trapped micro-objects may be independently manoeuvred transverse to the trapping light beams 36, 38 within the field of view of the optics 44, 46 outputting the counter-propagating light beams towards the manipulation volume 14, and may simultaneously be manoeuvred along the axial direction of the light beams 36, 38 over a distance of, e.g. 100 μm.

Several features of DMDs are advantageously utilized in the illustrated embodiments of the present invention. DMDs are wavelength independent so that light sources with a broad output spectrum may be utilized in the system, e.g. multiple laser wavelengths simultaneously or a white light source, such as a super continuum source. Further, DMDs are polarisation independent so that e.g. fibre lasers may be utilized in the system. Still further, DMDs has a high accuracy, a high fill factor, a high reflectivity, and a high modulation speed, e.g. up to 8000 frames/sec.

The illustrated optical manipulation system 10 further comprises microscope objective lenses 48, 50 for focusing the deflected light beams 36, 38 onto the micro-object manipulation volume 14.

Figure 2:
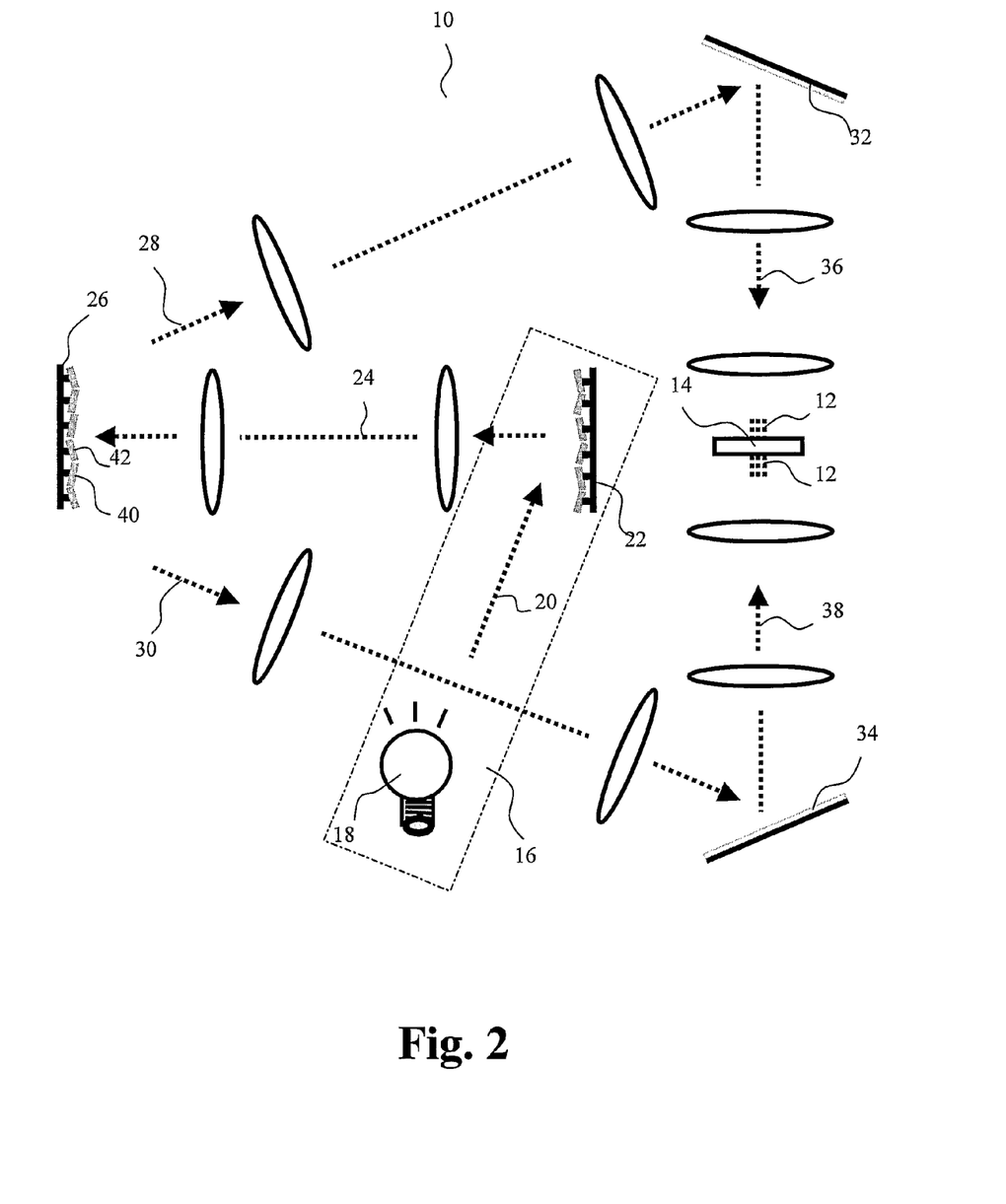

The embodiment 10 illustrated in FIG. 2 is identical to the embodiment of FIG. 1 except for the fact that the embodiment of FIG. 2 does not have microscope objective lenses. Hereby, a large field of view is obtained, i.e. the cross-section of the micro-object manipulation volume 14 is increased.

Figure 3:
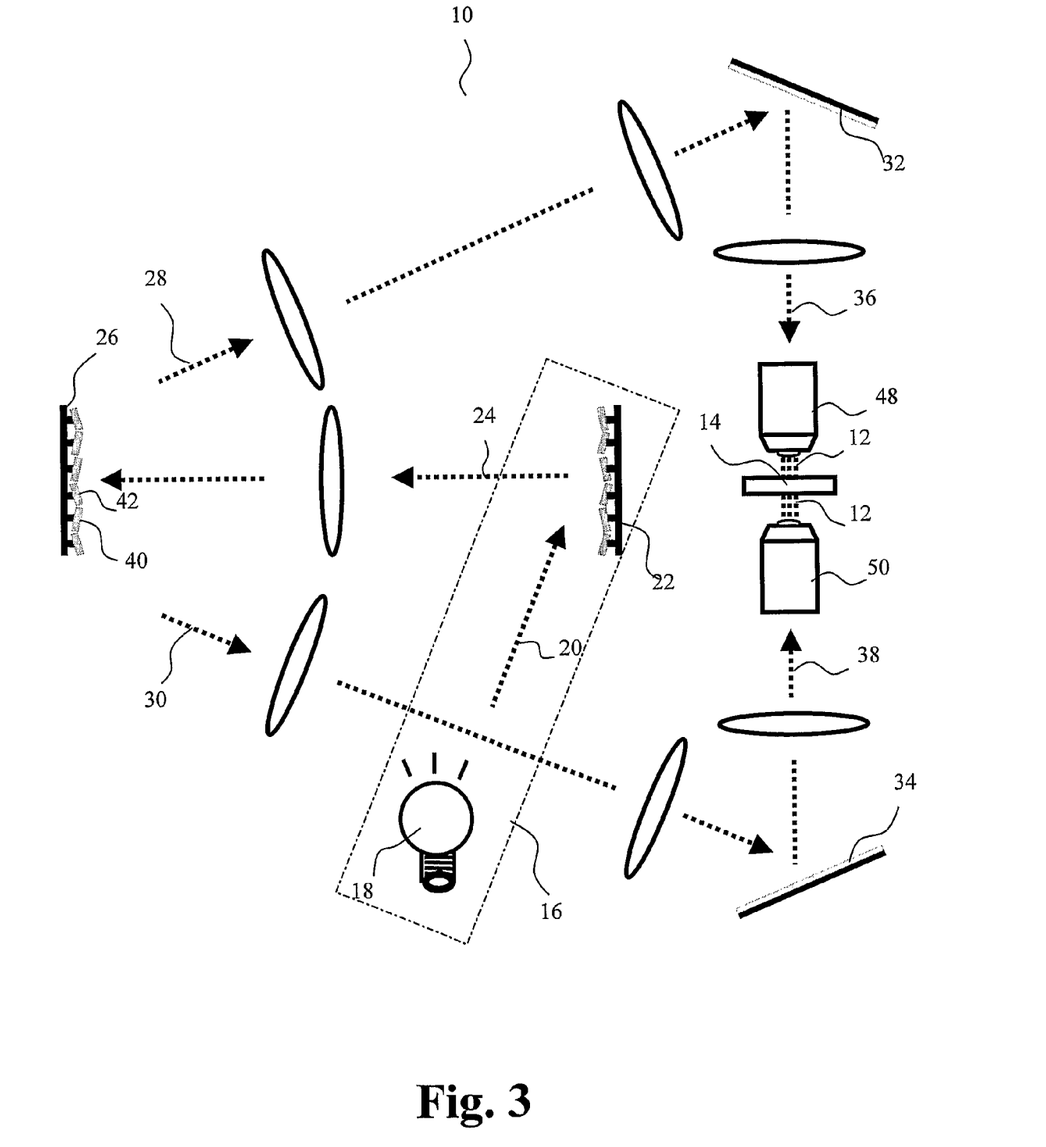

The embodiment 10 illustrated in FIG. 3 is identical to the embodiment of FIG. 1 except for the fact that the embodiment of FIG. 3 has a single imaging lens only in the propagation path of the first intensity modulated light beam 24.

Figure 4:
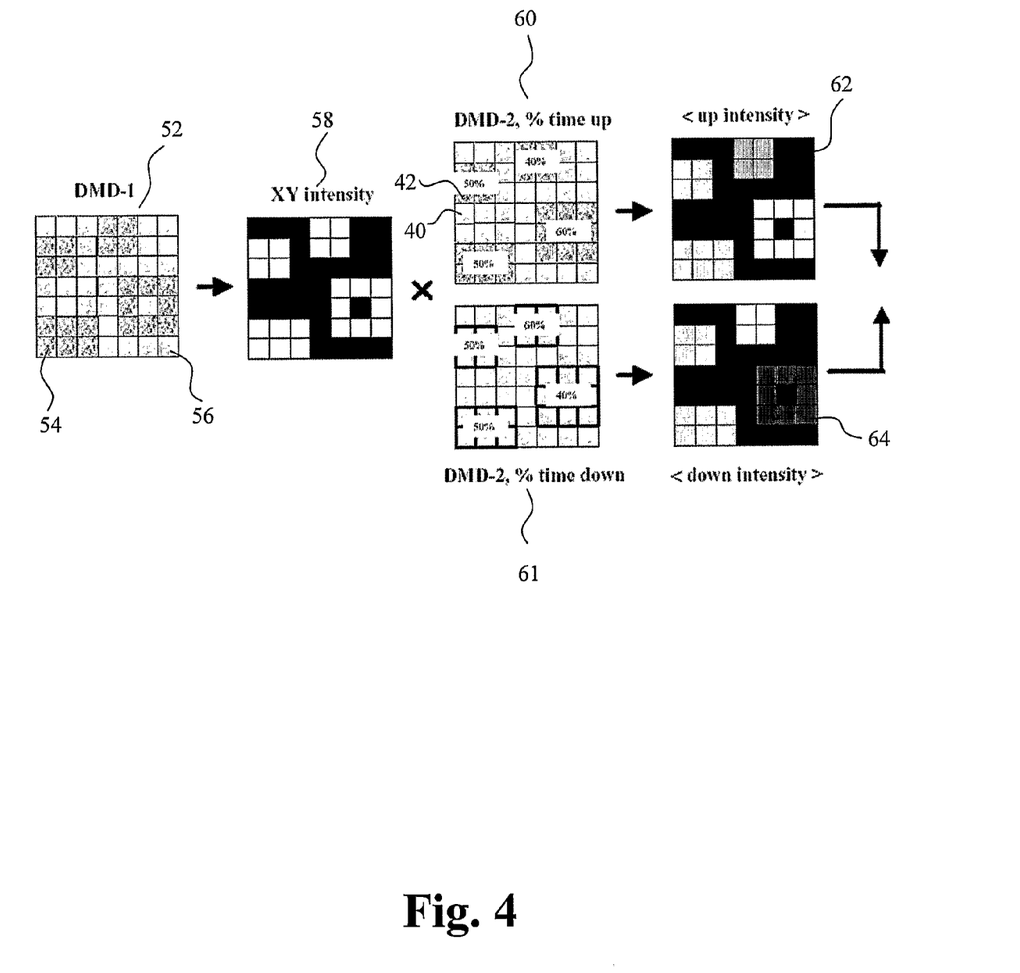

FIG. 4 schematically illustrates the spatial intensity modulation of light beams performed by the DMDs 22, 26. A part 52 of the mirror array of DMD 22 is shown in the left part of FIG. 4. In one of its positions, a mirror 54 reflects light into the path of propagation of intensity modulated light beam 24, while a mirror 56 in the other position reflects light away from the propagation path of light beam 24. Thus, the corresponding part of the cross-section of the light beam 24 gets the intensity profile 58. Likewise, a part 60 of the mirror array of DMD 26 is shown in the central part of FIG. 4. As already mentioned, in one of its positions, a mirror 40, 42 reflects the incoming beam 24 into the second modulated light beam 28 and into the third modulated light beam 30 in the other position, thus the two beams 28, 30 are generated by time multiplexed deflection. As examples, duty cycles of 40 and 50% are indicated for some of the mirrors, which lead to the intensity profiles 62, 64 of the counter-propagating light beams 36, 38. Adjustment of the duty cycles leads to movement of trapped micro-objects along the direction of propagation of the light beams 36, 38 due to the resulting increase of average radiation force acting on one side of the micro-object and corresponding decrease of the average radiation force acting on the opposite side of the micro-object.

Figure 5:
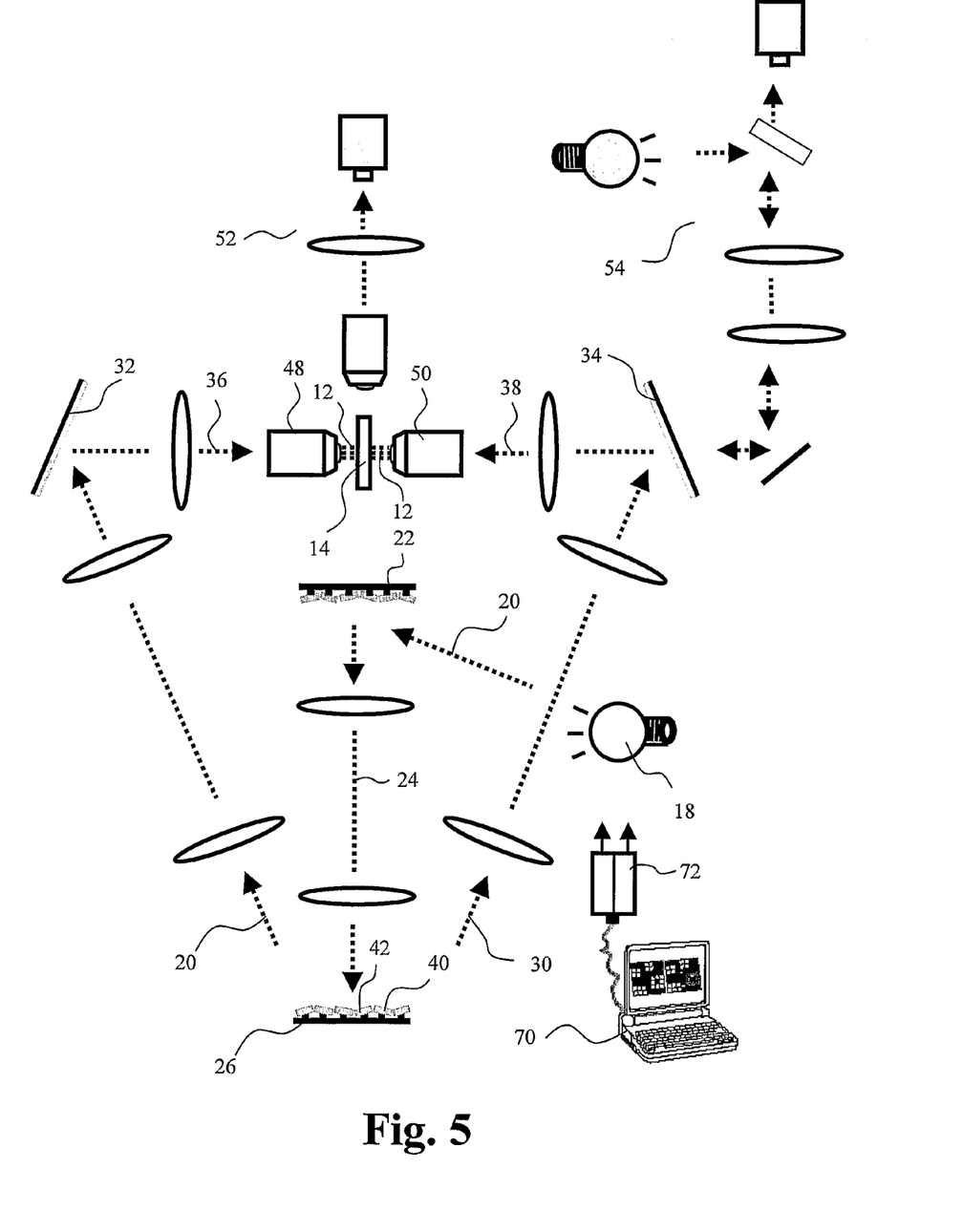

The embodiment 10 illustrated in FIG. 5 is identical to the embodiment of FIG. 1 except for the fact that the embodiment of FIG. 5 has optical monitoring systems 52, 54 for observation of micro-objects in the micro-object manipulation volume 14, for example for monitoring the path of movement of individual micro-objects, e.g. based on visual inspection, fluorescence, etc, e.g. for cytometry.

The optical manipulation systems 10 illustrated in FIGS. 1, 2, 3, and 5 are controlled by a computer 70 (only shown in FIG. 5) comprising interfaces 72 for addressing each of the mirrors 40, 42 of the DMDs 22, 26 so that the computer controls the individual positioning of each mirror 40, 42 in the DMDs 22, 26. Further, the computer may control the light source, e.g. the output intensity of the light source. The computer 70 also comprises input means, such as a keyboard, a mouse, a diskette drive, an optical disc drive, a network interface, a modem, etc, for receiving user commands, software updates, etc. In embodiments with monitoring systems 52, 54, as shown in FIG. 5, the computer 70 may further be interfaced with the monitoring system 52, 54, e.g. for image capturing for displaying micro-objects in the micro-object manipulation volume 14. It should be noted that the monitoring system 52, observing the manipulation volume 14 from a direction perpendicular to the counter-propagating beams is very difficult in conventional tweezer systems. Conventional tweezer systems require strongly focussed beams, which in turn requires immersion in oil or water of the high numerical aperture microscope objective lenses hence positioned in close proximity to the manipulation volume making observation from the side, i.e. from a direction perpendicular to the optical tweezers, very difficult.

It should further be noted that since the beams need not be strongly focussed, the system is capable of providing a long working distance, e.g. greater than several millimetres, between optical components and the manipulation volume and a wide manipulation volume, inter alia along the direction of propagation of the counter-propagating beams, and also a large field of view for imaging, e.g. through one of the microscope objective lenses 48, 50. Although, the system 52 is illustrated as observing the manipulation volume from the side, simultaneous monitoring of trapped particles as observed from various arbitrary solid angles is possible.

A user of the system may move individual micro-objects around using the mouse, e.g. by moving the cursor onto the image of the micro-object to be moved and select the micro-object by a mouse click. The selected micro-object may for example be moved in the plane perpendicular to the propagation direction of the counter-propagating beams 36, 38 by dragging the mouse while pressing the left mouse button, and the selected micro-object may be moved in the direction of propagation of the counter-propagating beams 36, 38 by dragging the mouse while pressing the right mouse button.

Figure 6:
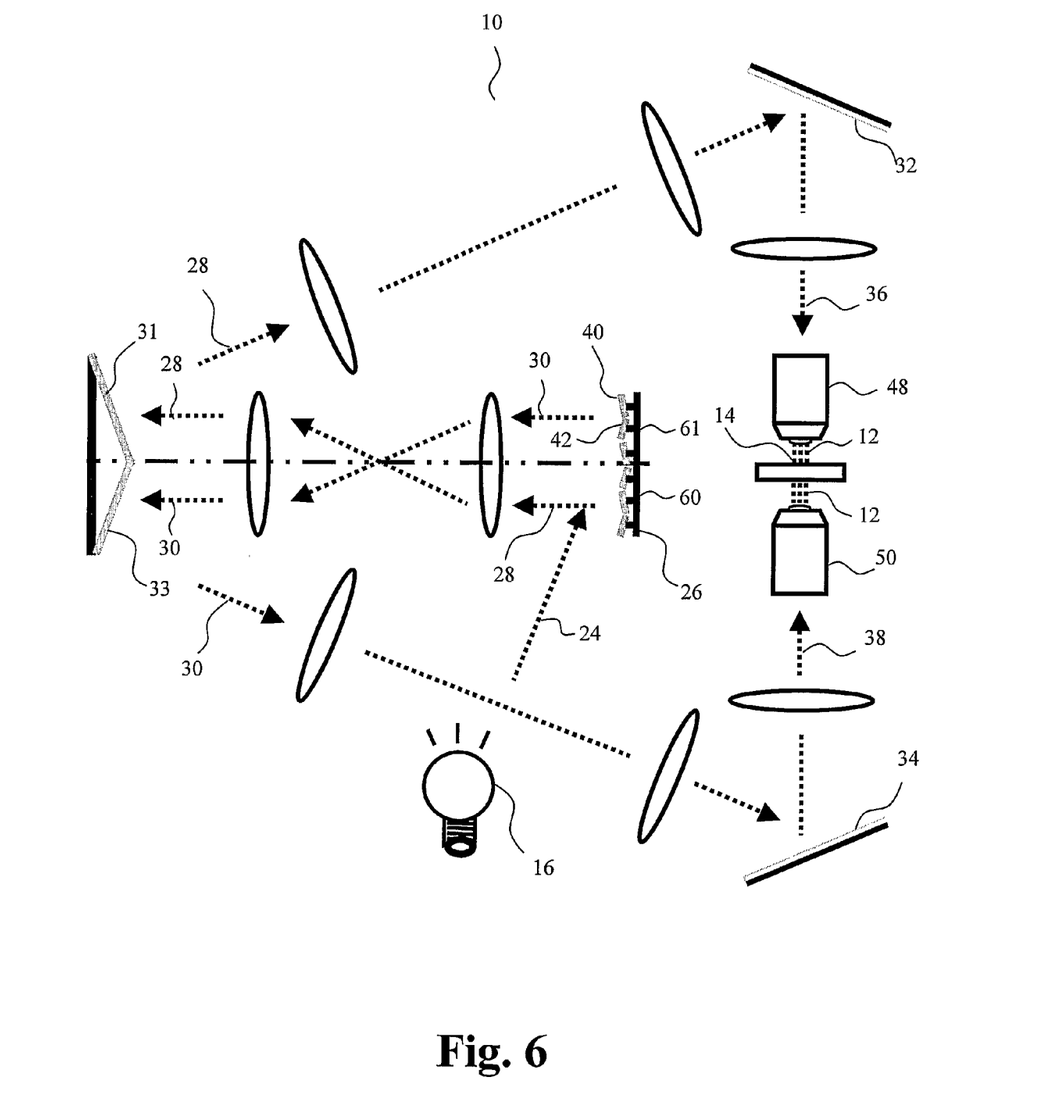

FIG. 6 schematically illustrates yet another preferred embodiment of an optical manipulation system 10 for generation of a plurality of optical traps for manipulation of micro-objects (not shown) in a micro-object manipulation volume 14. The system 10 comprises a spatially modulated light source 16 for emission of a light beam 24 propagating towards an adjustable spatial light modulator 26, which in the illustrated embodiment is a digital micro-mirror device (DMD) 26, for generating a second and a third intensity modulated light beam 28, 30, the second intensity modulated light beam 28 propagating towards first deflectors 31, 32, e.g. mirrors, for deflection of the second light beam 28 towards the micro-object manipulation volume 14, and the third intensity modulated light beam 30 propagating towards second deflectors 33, 34 for deflection of the third light beam 30 towards the micro-object manipulation volume 14 in opposite direction of the second light beam 28. Thus, the second intensity modulated beam 28 is formed by one half 60 of the DMD 26, and the third intensity modulated beam 30 is formed by the other half 61 of the DMD, and thereby the resolution of the intensity modulated beams 28, 30 is half the resolution of the DMD 26 whereas the resolution of the corresponding beams of the embodiments shown in FIGS. 1-3 is equal to the resolution of the DMDs 22, 26. Alternatively, in yet another embodiment, the DMD 26 of FIG. 6 may be substituted by two DMDs, one of which forms the second intensity modulated beam 28 and the other forms the third intensity modulated beam 30, so that the resolution of the beams is equal to the resolution of the respective DMD.

The intensity modulation performed by DMD 26 of FIG. 6 is further explained with reference to FIG. 4.

FIG. 4 also schematically illustrates the spatial intensity modulation of light beams performed by the DMD 26 of FIG. 6. The two halves 60, 61 of the mirror array of DMD 26 are shown in the central part of FIG. 4. One half 60 of DMD 26 modulates the second intensity modulated beam 28, and the other half 61 of DMD 26 modulates the third intensity modulated beam 30. In one of its positions, a mirror 40, 42 reflects the incoming beam 24 into the second modulated light beam 28 and away from the second modulated light beam 28 in the other position. Likewise for the other half 61 of DMD 26, a mirror reflects the incoming beam 24 into the third modulated light beam 30 in one of its positions and away from the third modulated light beam 30 in the other of its positions. Thus the two beams 28, 30 are generated by time-multiplexed deflection. As examples, duty cycles of 40, 50, and 60% are indicated for some of the mirrors, which lead to the intensity profiles 62, 64 of the counter-propagating light beams 36, 38. Coordinated adjustment of the duty cycles of mirror of the two halves 60, 61 leads to movement of trapped micro-objects along the direction of propagation of the light beams 36, 38 due to the resulting increase of average radiation force acting on one side of the micro-object and corresponding decrease of the average radiation force acting on the opposite side of the micro-object.

Thus, in the illustrated embodiment, the optical manipulation system 10 provides sets of beams 12 propagating along substantially the same axis of propagation but in opposite directions thereby forming a significant average trapping force along the propagation axis of the beams for trapping of a micro-object.

The invention claimed is:

1. An optical manipulation system for generation of a plurality of optical traps for manipulation of micro-objects including nano-objects in a micro-object manipulation volume, the system comprising
    a light source for illumination of
    a first Digital Micro-mirror Device, each mirror of which may toggle between two positions at a selected frequency and a selected duty cycle for splitting an incoming light beam into two deflected light beams by time multiplexed deflection in such a way that changing the duty cycle will increase the average intensity of one of the deflected light beams and decrease the average intensity of the other deflected light beam correspondingly,
    time multiplexed deflected light beams propagating towards a respective one of a first and a second deflector for deflection of the respective light beams for intersecting or counter-propagating in the micro-object manipulation volume.

2. An optical manipulation system according to claim 1, wherein the light source comprises an array of light sources with adjustable intensities for illumination of the first Digital Micro-mirror Device with a spatially modulated intensity profile.

3. An optical manipulation system according to claim 2, wherein the spatially modulated light source comprises an array of vertical cavity surface emitting lasers VCSELs.

4. An optical manipulation system according to claim 1, further comprising a second Digital Micro-mirror Device illuminated by the light source for modulation of light illuminating the first Digital Micro-mirror Device.

5. An optical manipulation system according to claim 1, further comprising microscope objective lenses for focusing the deflected light beams onto the micro-object manipulation volume.

6. An optical manipulation system according to claim 2, further comprising microscope objective lenses for focusing the deflected light beams onto the micro-object manipulation volume.

7. An optical manipulation system according to claim 3, further comprising microscope objective lenses for focusing the deflected light beams onto the micro-object manipulation volume.

8. An optical manipulation system according to claim 4, further comprising microscope objective lenses for focusing the deflected light beams onto the micro-object manipulation volume.

9. An optical manipulation system according to claim 1, further comprising an observation system for observing the micro-object manipulation volume from a plurality of directions, simultaneously.

10. An optical manipulation system according to claim 2, further comprising an observation system for observing the micro-object manipulation volume from a plurality of directions, simultaneously.

11. An optical manipulation system according to claim 3, further comprising an observation system for observing the micro-object manipulation volume from a plurality of directions, simultaneously.

12. An optical manipulation system according to claim 4, further comprising an observation system for observing the micro-object manipulation volume from a plurality of directions, simultaneously.

13. An optical manipulation system according to claim 1, further comprising a computer that is adapted for user control of the manipulation of micro-objects including nano-objects in the manipulation volume and simultaneous display of the micro-objects including nano-objects in the manipulation volume.

14. An optical manipulation system according to claim 2, further comprising a computer that is adapted for user control of the manipulation of micro-objects including nano-objects in the manipulation volume and simultaneous display of the micro-objects including nano-objects in the manipulation volume.

15. An optical manipulation system according to claim 3, further comprising a computer that is adapted for user control of the manipulation of micro-objects including nano-objects in the manipulation volume and simultaneous display of the micro-objects including nano-objects in the manipulation volume.

16. An optical manipulation system according to claim 4, further comprising a computer that is adapted for user control of the manipulation of micro-objects including nano-objects in the manipulation volume and simultaneous display of the micro-objects including nano-objects in the manipulation volume.

* * * * *